US009946608B1

(12) United States Patent
Per et al.

(10) Patent No.: US 9,946,608 B1
(45) Date of Patent: Apr. 17, 2018

(54) CONSISTENT BACKUP OF BLOCKS THROUGH BLOCK TRACKING

(71) Applicant: Acronis International GmBh, Shaffhausen (CH)

(72) Inventors: Yuri Per, Moscow Region (RU); Serguei M. Beloussov, Costa Del Sol (SG); Stanislav Protasov, Moscow (RU); Maxim V. Lyadvinsky, Moscow (RU); Alexey Tyuryumov, Omsk (RU); Alexey Morlang, Moscow Region (RU)

(73) Assignee: Acronis International GmbH (CH)

(*) Notice: Subject to any disclaimer, the term of this patent is extended or adjusted under 35 U.S.C. 154(b) by 152 days.

(21) Appl. No.: 14/869,338

(22) Filed: Sep. 29, 2015

Related U.S. Application Data

(60) Provisional application No. 62/058,059, filed on Sep. 30, 2014.

(51) Int. Cl.
G06F 12/00 (2006.01)
G06F 13/00 (2006.01)
G06F 13/28 (2006.01)
G06F 11/14 (2006.01)
G06F 3/06 (2006.01)

(52) U.S. Cl.
CPC .......... G06F 11/1461 (2013.01); G06F 3/064 (2013.01); G06F 3/0617 (2013.01); G06F 3/0673 (2013.01); G06F 11/1451 (2013.01); G06F 3/0619 (2013.01); G06F 3/0683 (2013.01); G06F 11/1448 (2013.01); G06F 2201/84 (2013.01)

(58) Field of Classification Search
CPC ............ G06F 11/1461; G06F 11/1448; G06F 11/1451; G06F 3/0617; G06F 3/0619; G06F 3/0673; G06F 3/0683; G06F 3/064; G06F 2201/84
USPC .................................. 711/161-162
See application file for complete search history.

(56) References Cited

U.S. PATENT DOCUMENTS

| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |
| 7,603,533 | B1 | 10/2009 | Tsypliaev et al. |
| 7,636,824 | B1 | 12/2009 | Tormasov |
| 7,650,473 | B1 | 1/2010 | Tormasov et al. |
| 7,721,138 | B1 | 5/2010 | Lyadvinsky et al. |
| 7,779,221 | B1 | 8/2010 | Tormasov et al. |
| 7,831,789 | B1 | 11/2010 | Tsypliaev et al. |
| 7,886,120 | B1 | 2/2011 | Tormasov |

(Continued)

Primary Examiner — Daniel C Chappell
Assistant Examiner — Shane Woolwine
(74) Attorney, Agent, or Firm — K&L Gates LLP

(57) ABSTRACT

A method for creating an inconsistent backup and then a consistent backup is described. The method may include creating an inconsistent, full backup of a storage device. The method may further include creating a first snapshot of the storage device. The method may also include creating a consistent backup increment of the storage device based on the first snapshot. Additionally, the method may include adding the consistent backup increment to the inconsistent, full backup.

16 Claims, 8 Drawing Sheets

(56) References Cited

U.S. PATENT DOCUMENTS

| | | | |
|---|---|---|---|
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 2006/0225065 A1 | 10/2006 | Chandhok et al. | |
| 2010/0011178 A1 | 1/2010 | Feathergill | |
| 2010/0306171 A1* | 12/2010 | Antos | G06F 11/1448 707/638 |
| 2011/0218967 A1* | 9/2011 | Sliger | G06F 12/00 707/647 |
| 2015/0134899 A1* | 5/2015 | Cudak | G06F 11/1461 711/112 |
| 2015/0142748 A1* | 5/2015 | Gottemukkula | G06F 11/1451 707/649 |
| 2015/0186044 A1* | 7/2015 | Sharma | G06F 3/065 711/162 |

* cited by examiner

US 9,946,608 B1

CONSISTENT BACKUP OF BLOCKS THROUGH BLOCK TRACKING

CROSS-REFERENCE TO RELATED APPLICATIONS

This application claims priority to and the benefit of U.S. provisional patent application No. 62/058,059, filed on Sep. 30, 2014, the disclosure of which is herein incorporated by reference in its entirety.

TECHNICAL FIELD

The technical field may generally relate to backup of physical or virtual machines and more particularly to consistent backup of physical or virtual machine files.

BACKGROUND

Physical or virtual machines may run business critical or other applications. An entire physical or virtual machine or individual files or folders of the physical or virtual machine may require backup to ensure that the physical or virtual machine may be recovered in the event of a failure. Such backup of a physical or virtual machine may be difficult to create because the physical or virtual machine disks and/or drives may be altered regularly by users or system applications. For example, once a backup of a physical or virtual machine is initiated, a user may write data to one or more drives of the physical or virtual machine, thus altering the data that requires backup. Further, in some situations, backup of physical or virtual machines may consume too many system resources and may bog down the system.

BRIEF SUMMARY

In an embodiment, a method for creating an inconsistent backup and then a consistent backup may include creating an inconsistent, full backup of a storage device. The method may further include creating a first snapshot of the storage device. The method may also include creating a consistent backup increment of the storage device based on the first snapshot. The method may additionally include adding the consistent backup increment to the inconsistent, full backup.

One or more of the following features may be included. The method may further include tracking changes to the storage device when a full backup is started. The method may also include creating a second snapshot of the storage device. The method may additionally include backing up the changed sectors from a tracker driver into the consistent backup increment.

In an embodiment, a method for creating a consistent backup may include creating a first snapshot of a storage device. The method may further include creating a full backup of the storage device. The method may also include, in response to determining that an error occurred during the full backup, continue creating the full backup as an inconsistent backup. The method may additionally include creating a second snapshot of the storage device. Moreover, the method may include creating a consistent backup increment of the storage device based on the second snapshot. The method may also include adding the consistent backup increment to the inconsistent, full backup.

One or more of the following features may be included. The method may include tracking changes to the storage device when a full backup is started. The method may further include creating a third snapshot of the storage device. The method may also include backing up the changed sectors from a tracker driver into the consistent backup increment.

In an embodiment, a method for consistent backup of at least a portion of a storage device may include creating, using a service running on a computing device, a snapshot of at least a portion of a storage device. The method may further include creating, using a backup application running on the computing device, a backup of the portion of the storage device. The method may also include tracking, using a driver running on the computing device, changes to the portion of the storage device. The method may additionally include, in response to determining, at the computing device, that the backup of the portion of the storage device is an inconsistent backup, updating the backup, using the backup application running on the computing device, by backing up missed blocks from the portion of the storage device, the missed blocks being blocks that were not backed up in the backup of the portion of the storage device. Moreover, the method may include updating the backup, using the backup application running on the computing device, by backing up changed blocks from the portion of the storage device, the changed blocks being blocks that were tracked by the driver as changed since the backup was created.

One or more of the following features may be included. The method may include, in response to determining that the backup of the portion of the storage device is a consistent backup, updating the backup, using the backup application running on the computing device, by backing up the changed blocks from the portion of the storage device, the changed blocks being blocks that were tracked by the driver as changed since the backup was created. The method may further include in response to determining that the snapshot of the portion of the storage device failed designating the backup as an inconsistent backup. The method may also include comparing the changed blocks from the portion of the storage device with the backup blocks from the backup of the portion of the storage device.

In an embodiment, a computer program product may reside on a computer readable storage medium and may have a plurality of instructions stored on it. When executed by a processor, the instructions may cause the processor to perform operations for consistent backup of at least a portion of a storage device. The operations may include creating, using a service running on a computing device, a snapshot of at least a portion of a storage device. The operations may further include creating, using a backup application running on the computing device, a backup of the portion of the storage device. The operations may also include tracking, using a driver running on the computing device, changes to the portion of the storage device. The operations may additionally include, in response to determining, at the computing device, that the backup of the portion of the storage device is an inconsistent backup, updating the backup, using the backup application running on the computing device, by backing up missed blocks from the portion of the storage device, the missed blocks being blocks that were not backed up in the backup of the portion of the storage device. Moreover, the operations may include updating the backup, using the backup application running on the computing device, by backing up changed blocks from the portion of the storage device, the changed blocks being blocks that were tracked by the driver as changed since the backup was created.

One or more of the following features may be included. The operations may include, in response to determining that the backup of the portion of the storage device is a consistent backup, updating the backup, using the backup application running on the computing device, by backing up the changed blocks from the portion of the storage device, the changed blocks being blocks that were tracked by the driver as changed since the backup was created. The operations may further include in response to determining that the snapshot of the portion of the storage device failed designating the backup as an inconsistent backup. The operations may also include comparing the changed blocks from the portion of the storage device with the backup blocks from the backup of the portion of the storage device.

In an embodiment, a computing system for consistent backup of at least a portion of a storage device may include one or more processors. The one or more processors may be configured to create, using a service running on a computing device, a snapshot of at least a portion of a storage device. The one or more processors may be further configured to create, using a backup application running on the computing device, a backup of the portion of the storage device. The one or more processors may also be configured to track, using a driver running on the computing device, changes to the portion of the storage device. The one or more processors may additionally be configured to, in response to determining, at the computing device, that the backup of the portion of the storage device is an inconsistent backup, update the backup, using the backup application running on the computing device, by backing up missed blocks from the portion of the storage device, the missed blocks being blocks that were not backed up in the backup of the portion of the storage device. Moreover, the one or more processors may be configured to update the backup, using the backup application running on the computing device, by backing up changed blocks from the portion of the storage device, the changed blocks being blocks that were tracked by the driver as changed since the backup was created.

One or more of the following features may be included. The one or more processors may be configured to, in response to determining that the backup of the portion of the storage device is a consistent backup, update the backup, using the backup application running on the computing device, by backing up the changed blocks from the portion of the storage device, the changed blocks being blocks that were tracked by the driver as changed since the backup was created. The one or more processors may also be configured to in response to determining that the snapshot of the portion of the storage device failed, designate the backup as an inconsistent backup. The one or more processors may additionally be configured to compare the changed blocks from the portion of the storage device with the backup blocks from the backup of the portion of the storage device.

In an embodiment, a method for consistent backup of at least a portion of a storage device may include creating, using a backup application running on a computing device, a backup of at least a portion of a storage device. The method may further include recording, at the computing device, a number of changes to the portion of the storage device during the backup. The method may also include calculating, at the computing device, a backup metric based upon, at least in part, the number of changes to the portion of the storage device during the backup and a number of items remaining to be backed up from the portion of the storage device. Additionally, the method may include, in response to determining, at the computing device, that the backup metric is higher than a backup threshold creating, using a service running on the computing device, a snapshot of the portion of the storage device. Moreover, the method may include tracking, using a driver running on the computing device, changes to the portion of the storage device. The method may further include updating the backup, using the backup application running on the computing device, by backing up changed blocks from the portion of the storage device, the changed blocks being blocks that were tracked by the driver as changed.

One or more of the following features may be included. The method may include, in response to determining that the snapshot of the portion of the storage device failed, updating the backup, using the backup application running on the computing device, by backing up changed blocks from the portion of the storage device, the changed blocks being blocks that were tracked by the driver as changed. The method may further include, in response to determining that the backup threshold has not been reached after a threshold time updating the backup, using the backup application running on the computing device, by backing up changed blocks from the portion of the storage device, the changed blocks being blocks that were tracked by the driver as changed. The backup threshold may be a ratio of changed data to unchanged data in the portion of the storage device since the backup was created.

In an embodiment, a computer program product may reside on a computer readable storage medium and may have a plurality of instructions stored on it. When executed by a processor, the instructions may cause the processor to perform operations for consistent backup of at least a portion of a storage device. The operations may include creating, using a backup application running on a computing device, a backup of at least a portion of a storage device. The operations may further include recording, at the computing device, a number of changes to the portion of the storage device during the backup. The operations may also include calculating, at the computing device, a backup metric based upon, at least in part, the number of changes to the portion of the storage device during the backup and a number of items remaining to be backed up from the portion of the storage device. Additionally, the operations may include, in response to determining, at the computing device, that the backup metric is higher than a backup threshold creating, using a service running on the computing device, a snapshot of the portion of the storage device. Moreover, the operations may include tracking, using a driver running on the computing device, changes to the portion of the storage device. The operations may further include updating the backup, using the backup application running on the computing device, by backing up changed blocks from the portion of the storage device, the changed blocks being blocks that were tracked by the driver as changed.

In an embodiment, a computing system for consistent backup of at least a portion of a storage device may include one or more processors. The one or more processors may be configured to create, using a backup application running on a computing device, a backup of at least a portion of a storage device. The one or more processors may also be configured to record, at the computing device, a number of changes to the portion of the storage device during the backup. The one or more processors may further be configured to calculate, at the computing device, a backup metric based upon, at least in part, the number of changes to the portion of the storage device during the backup and a number of items remaining to be backed up from the portion of the storage device. Additionally, the one or more processors may be configured to, in response to determining, at the computing device, that the backup metric is higher than a backup threshold creating, using a service running on the computing device, a snapshot of the portion of the storage device. Moreover, the one or more processors may be configured to track, using a driver running on the computing device, changes to the portion of the storage device. The one or more processors may be further configured to update the backup, using the backup application running on the computing device, by backing up changed blocks from the portion of the storage device, the changed blocks being blocks that were tracked by the driver as changed.

In an embodiment, a system for consistent backup of at least a portion of a storage device may include a service, running on a computing device that creates a snapshot of at least a portion of a storage device. The system may further include a backup application, running on the computing device that creates a backup of the portion of the storage device. The system may also include a driver, running on the computing device that tracks changes to the portion of the storage device. The backup application, in response to determining that the backup of the portion of the storage device is an inconsistent backup may updates the backup by backing up missed blocks from the portion of the storage device, the missed blocks being blocks that were not backed up in the backup of the portion of the storage device, and may updates the backup by backing up changed blocks from the portion of the storage device, the changed blocks being blocks that were tracked by the driver as changed since the backup was created.

The details of one or more implementations are set forth in the accompanying drawings and the description below. Other features and advantages will become apparent from the description, the drawings, and the claims.

DETAILED DESCRIPTION

Overview

Figure 1:
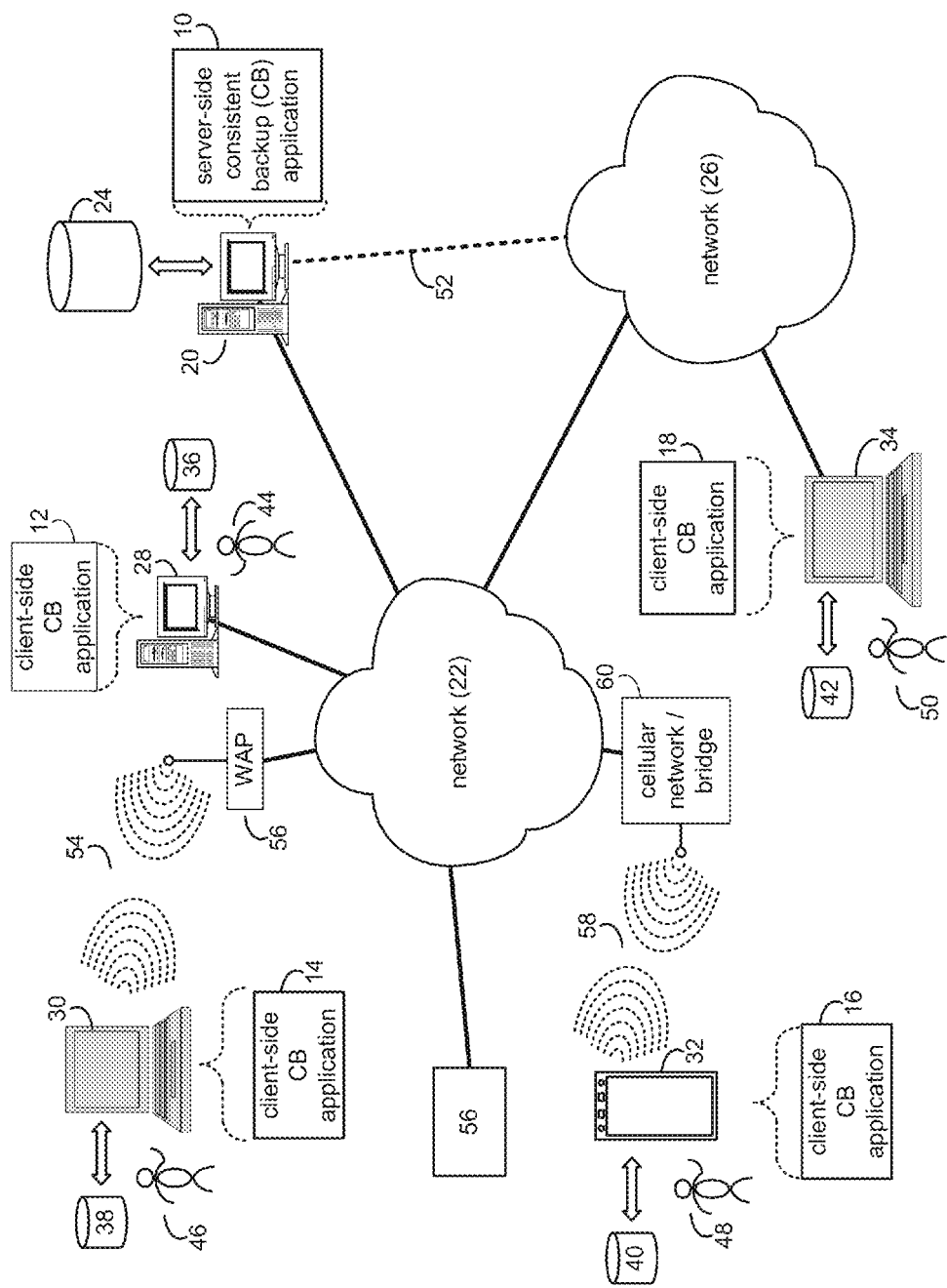
FIG. 1 depicts an example system that can execute implementations of the present disclosure.

A cloud provider or system administrator may institute backup and recovery procedures to ensure persistence of applications, data, or other resources accessed through one or more physical or virtual machines. For example, a backup archive of the physical or virtual machine may be created and stored onsite or offsite and may include the entire content of the physical or virtual machine before it failed. Efficient recovery of physical or virtual machines may be critical for proper business or other operations of an organization as application demands are likely to continue in the event of a physical or virtual machine failure.

Several types of backup for physical or virtual machines may exist. For example frozen data (unchanged data) from an inactive machine may be backed up. In this case, the data may not change and we may bet backed up them without any risk of losing new data or changed data. In other words, the data is unlikely to be changed by a user or system administrator during the backup process.

In another example, a live machine may be backed up. For example, a server may continue working without any interruptions during the backup process. Server data may be permanently changed during the backup process. If the server data is backed up without ensuring that the changed data is reflected in the backup, the backup data may be unreliable. In this case, the backup may become inconsistent. Some data may be lost and other data may be outdated.

To avoid the problems associated with inconsistent backups, a snapshot-based backup operation may be performed. In this case, a snapshot of the disk, drive, files, and/or folder being backed up may be created just before a backup process starts. The snapshot itself may not be a backup but may be used to facilitate the backup. The snapshot may save a state of the data to be backed up at a certain point in time. The backup process then proceeds to back up the data that was saved in the snapshot. At the same time, data from the disk, drive, files, and/or folder being backed up may change and may be updated. Any changes or updates to the data being backed up that occurred after the snapshot was created may not be included into final backup, but the changes or updates are known and may be used to supplement the backup.

Snapshotting may be a resource-consuming procedure and may require memory (RAM) resources, operating system resources, and/or free disk space. Further, the process of storing or keeping a snapshot may fail in some circumstances due to a lack of free disk space or free RAM. Keeping snapshots for too long may also impact system performance. If a snapshot fails during a backup process, the backup of the disk or drive may also fail. The result may be that system data is not protected in a given backup window and there may be a need to restart the backup. Restarting the backup process may again result in snapshot failure and, ultimately, in backup failure again.

In some systems, to avoid problems with snapshots, users may choose not to use a snapshot during backup. Or the user may decide to allocate or add additional resources (e.g. free disk space or RAM) and restart the backup process. However, a backup done without a snapshot may result in having inconsistent data in the backup (i.e., an inconsistent backup). Further, even with additional resources, another snapshot and failed backup may result, time may be lost, and the backup process may need to be restarted.

In view of the forgoing, there may be a need for a system that facilitates consistent backup of at least a portion of a storage device. Further, there may be a need to reduce snapshot lifetime to a minimum. In various implementations, the techniques and features described in the present disclosure are directed towards consistent backup of a physical or virtual machine file. In some systems, the techniques and features described herein may allow for minimizing the amount of time that a snapshot is kept, and may allow for less dependency on snapshots during backup.

Referring to FIG. 1, there is shown a server-side consistent backup (CB) application 10 and client-side CB applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as consistent backup process 10. Further, one or more of client applications 12, 14, 16, and 18 may be referred to as a process configured to carry out one or more of the features described herein, such as consistent backup processes 12, 14, 16, and/or 18.

As will be discussed below and referring now to FIG. 7, consistent backup process or application 10 may create 600, using a service running on a computing device, a snapshot of at least a portion of a storage device. Consistent backup process 10 may also create 602, using a backup application running on the computing device, a backup of the portion of the storage device. Consistent backup process 10 may further track 604, using a driver running on the computing device, changes to the portion of the storage device. Additionally, consistent backup process 10 may, in response to determining 606, at the computing device, that the backup of the portion of the storage device is an inconsistent backup, update 608 the backup, using the backup application running on the computing device, by backing up missed blocks from the portion of the storage device, the missed blocks being blocks that were not backed up in the backup of the portion of the storage device. Moreover, consistent backup process 10 may update 610 the backup, using the backup application running on the computing device, by backing up changed blocks from the portion of the storage device, the changed blocks being blocks that were tracked by the driver as changed since the backup was created.

The consistent backup process may be a server-side process (e.g., server-side consistent backup process 10), a client-side process (e.g., client-side consistent backup process 12, client-side consistent backup process 14, client-side consistent backup process 16, or client-side consistent backup process 18), or a hybrid server-side/client-side process (e.g., a combination of server-side consistent backup process 10 and one or more of client-side consistent backup processes 12, 14, 16, 18).

System Overview

Referring to FIG. 1, server-side consistent backup process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side consistent backup process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side consistent backup processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side consistent backup processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side consistent backup processes 12, 14, 16, 18 and/or server-side consistent backup process 10 may be processes that run within (i.e., are part of) a cloud computing site, cloud computing application, cloud platform, or cloud environment. Alternatively, client-side consistent backup processes 12, 14, 16, 18 and/or server-side consistent backup process 10 may be stand-alone applications that work in conjunction with the cloud computing site, cloud computing application, cloud platform, or cloud environment. One or more of client-side consistent backup processes 12, 14, 16, 18 and server-side consistent backup process 10 may interface with each other (via network 22 and/or network 26).

Users 44, 46, 48, 50 may access server-side consistent backup process 10 directly through the device on which the client-side consistent backup process (e.g., client-side consistent backup processes 12, 14, 16, 18) is executed, namely client electronic devices 28, 30, 32, 34, for example. Users 44, 46, 48, 50 may access server-side consistent backup process 10 directly through network 22 and/or through secondary network 26. Further, server computer 20 (i.e., the computer that executes server-side consistent backup process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Consistent Backup Process

For the following discussion, server-side consistent backup process 10 will be described for illustrative purposes and server computer 20 may run server-side consistent backup application 10 to carry out some or all of the techniques and features described here. It should be noted that server-side consistent backup process 10 may interact with client-side consistent backup process 12 and may be executed within one or more applications that allow for communication with client-side consistent backup process 12. However, this is not intended to be a limitation of this disclosure, as other configurations are possible (e.g., standalone, client-side consistent backup processes and/or standalone server-side consistent backup processes). For example, some implementations may include one or more of client-side consistent backup processes 12, 14, 16, and 18 in place of or in addition to server-side consistent backup process 10.

The systems and methods (e.g., consistent backup process 10) described herein relate to the backup of physical or virtual machines and/or physical or virtual machine disks, drives, files, and/or folders. In part, the systems and methods relate to continuing creation of disk backup in case of a snapshot failure, and more specifically, creating a consistent backup in the event of a snapshot failure.

The systems described herein may include one or more memory elements for backup of software, databases, and physical or virtual machines, and computer storage products including instructions to be executed by a processor to cause the processor to implement the methods described herein.

Figure 4:
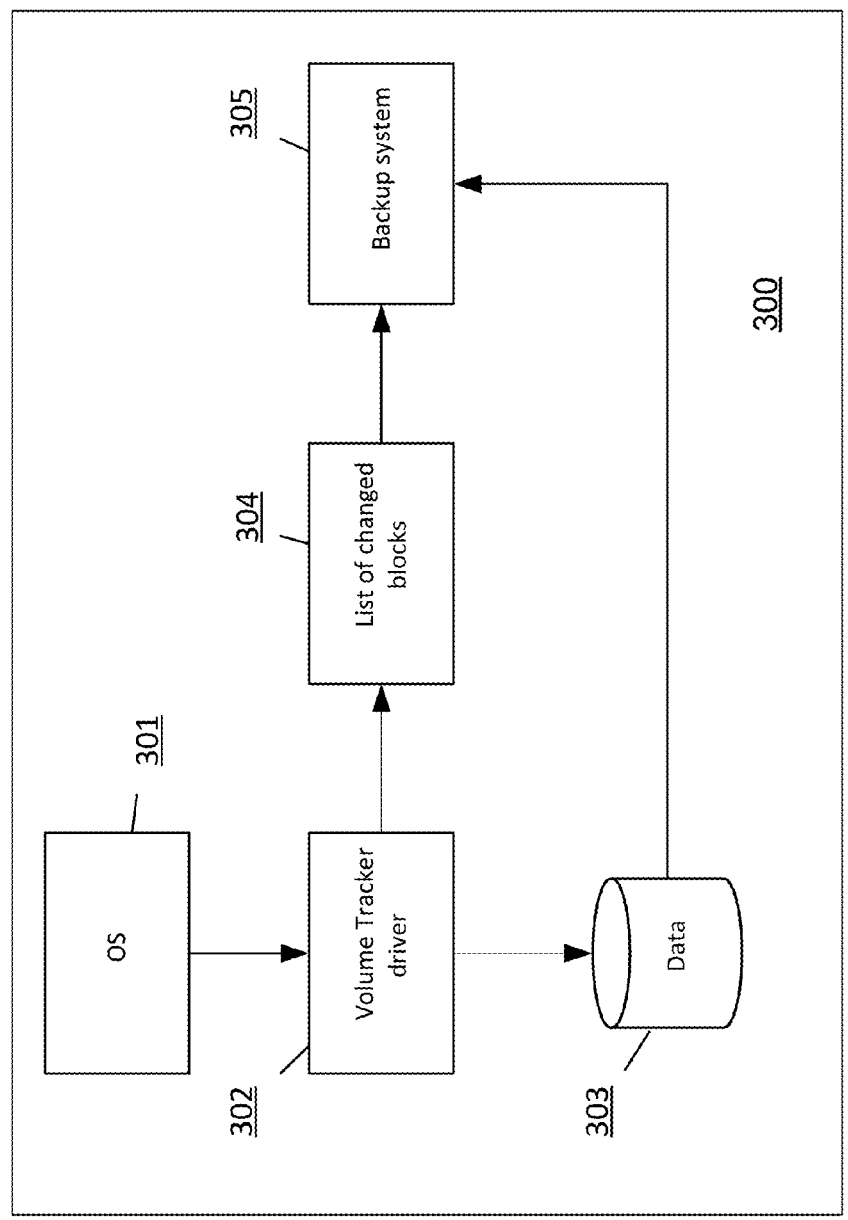
FIG. 4 also depicts an example system that can execute implementations of the present disclosure.

Referring now to FIG. 1, one or more of users 44, 46, 48, and 50 may be cloud administrators or system administrators or may be cloud or system end-users. Referring now also to FIG. 4, the cloud or system administrators may access and administer computing device 300 through one or more of server computer 20 or client electronic devices 28, 30, 32, 34 (respectively). In an embodiment, computing device 300 may be a physical computer system or virtualization host device. The virtualization host device may include a virtual machine and may run a cloud or virtualization application such as VMWare™ or may include a bare-metal embedded hypervisor (e.g. VMware™ ESX™ and VMware™ ESXi™). Further, the virtualization host device may include a vCloud™ architecture that may enhance cooperation between hypervisors. Consistent backup process 10 may include or may work in connection with an agent (e.g., a software module), which may include or may be configured to perform any number of the techniques or features described herein.

Consistent backup process 10 may include a software component, executable code, function, subroutine, or other set of instructions designed to carry out one or more operations for consistent backup. Consistent backup process 10 may coordinate a file restore and, in an embodiment, may require a separate machine where it can be run. This machine may be, for example, a virtual appliance, a Windows/Linux virtual machine, or a Windows/Linux physical machine, where the executable code of consistent backup process 10 can be executed.

Figure 6:
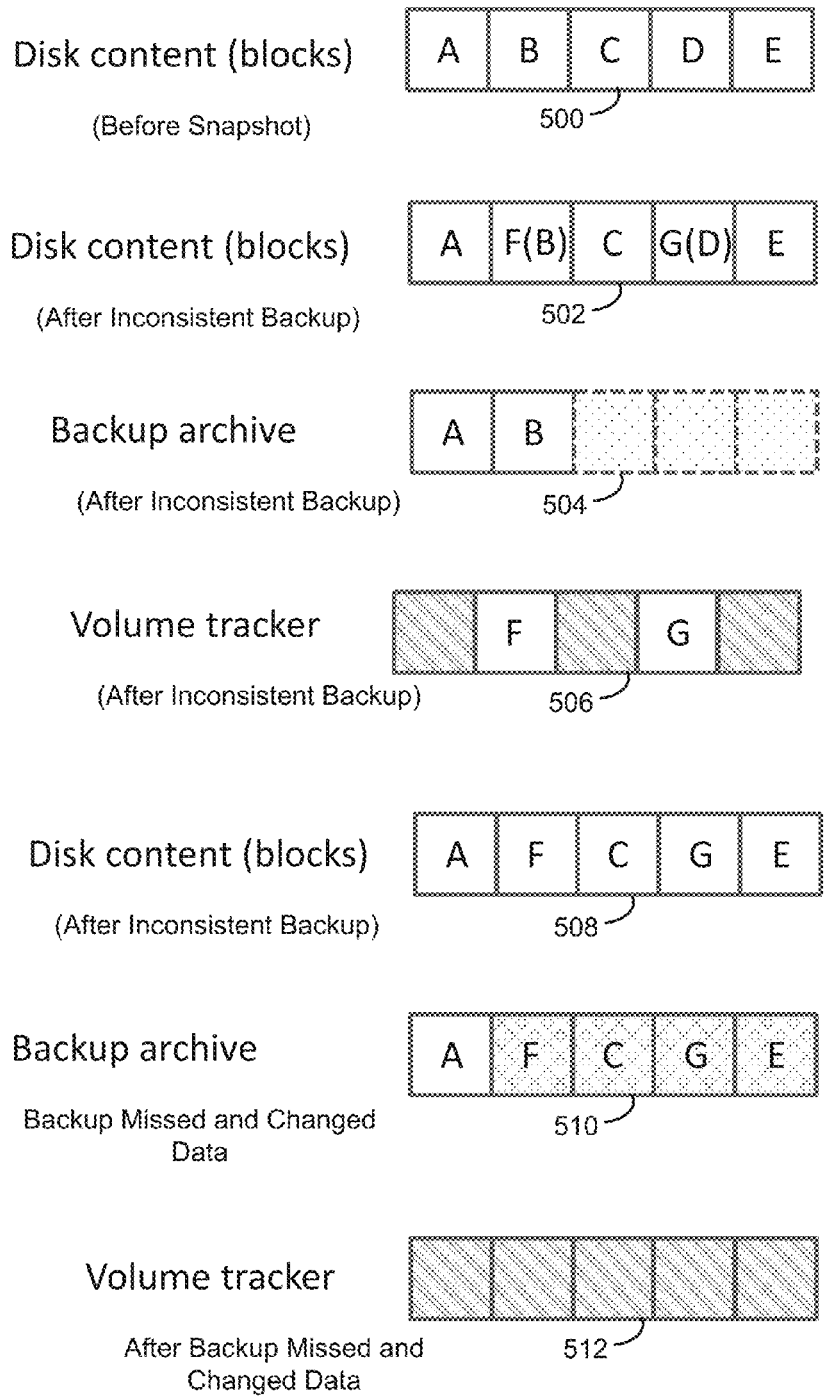
FIG. 6 depicts example blocks of a storage device being backed up in accordance with implementations of the present disclosure.

The physical or virtual machine may run, for example, business critical applications for which physical or virtual machine files may need to be backed up, recovered and/or restored upon a failure. The physical or virtual machine files may be backed up before a system failure. For example, the physical or virtual machine files may be backed up to an archive storage device where the files can be made available for restore upon a failure. Referring now to FIG. 4 and FIG. 6, blocks A, B, C, D, and E may be blocks of storage device 303 of computing device 300 and may each store several files. Computing device 300 may be a physical or virtual machine.

Using the techniques and features described here, a backup operation may be continued in the case of a snapshot failure. An additional backup may be created and may include data blocks that may have changed during or after the previous backup, thus making the additional backup consistent. If, during the additional backup, the snapshot fails again, another backup may be created, and so on.

When a snapshot is first initiated, it may not keep any information. When one or more disk blocks are changed, the snapshot feature may copy old data (that should be frozen) into a special shadow storage where snapshot data is kept. This method may reduce the amount of space needed for the snapshot because unchanged data may be kept on the disk itself and changed data may be kept in the shadow storage.

A backup operation or process may be initiated by a user. The user may select an entire disk or drive to be backed up, or may select a portion of the disk or drive to be backed up. In an implementation, the user may select one or more files or folders for backup. In response to receiving instructions for backup, a physical or virtual machine may begin a backup process. Referring now to FIG. 4 and FIG. 6, set of blocks 500 may store data A, B, C, D, and E and may exist in storage device 303 before any snapshot is created. The user may desire to backup the data in set of blocks 500.

Figure 2:
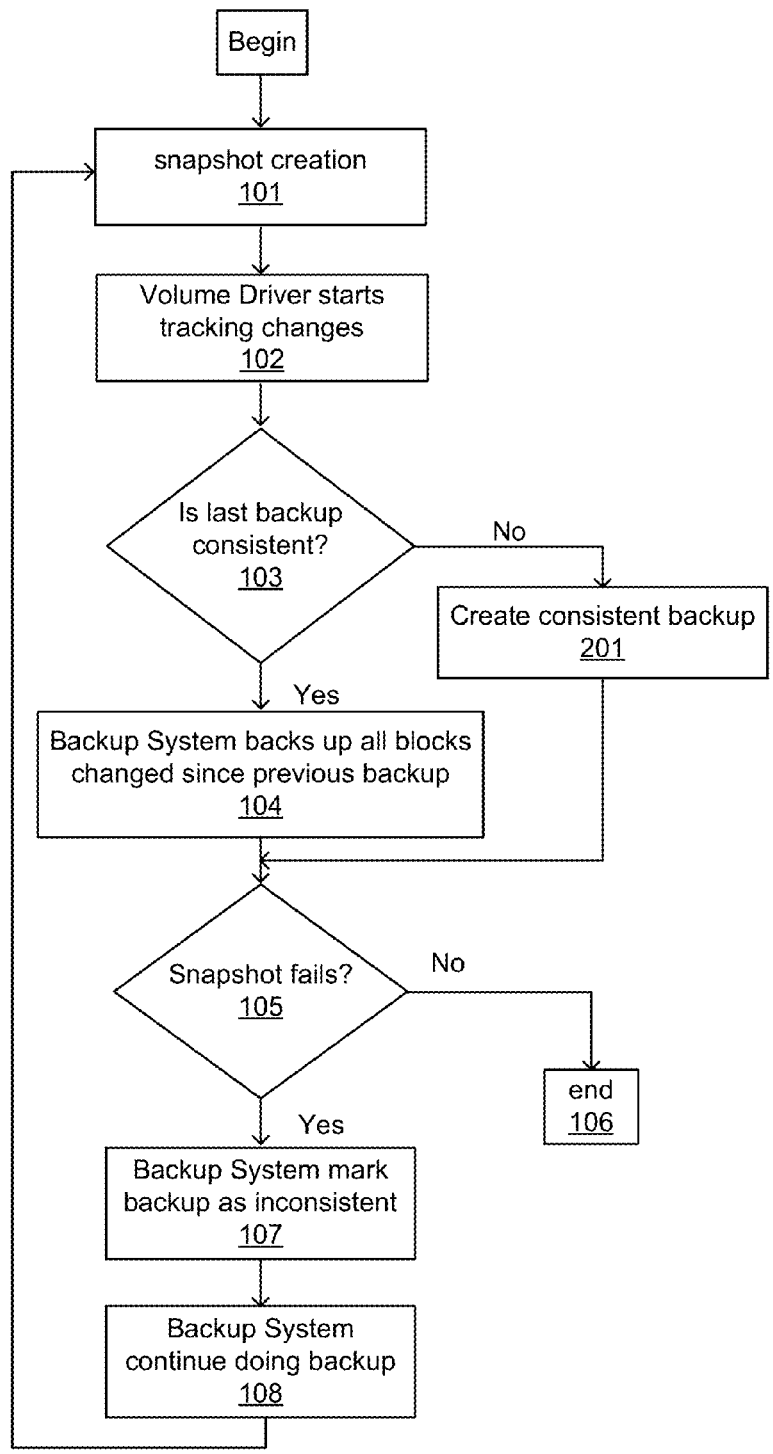
FIG. 2 is a flowchart illustrating an example process for consistent backup of at least a portion of a storage device in accordance with the present disclosure.
Figure 7:
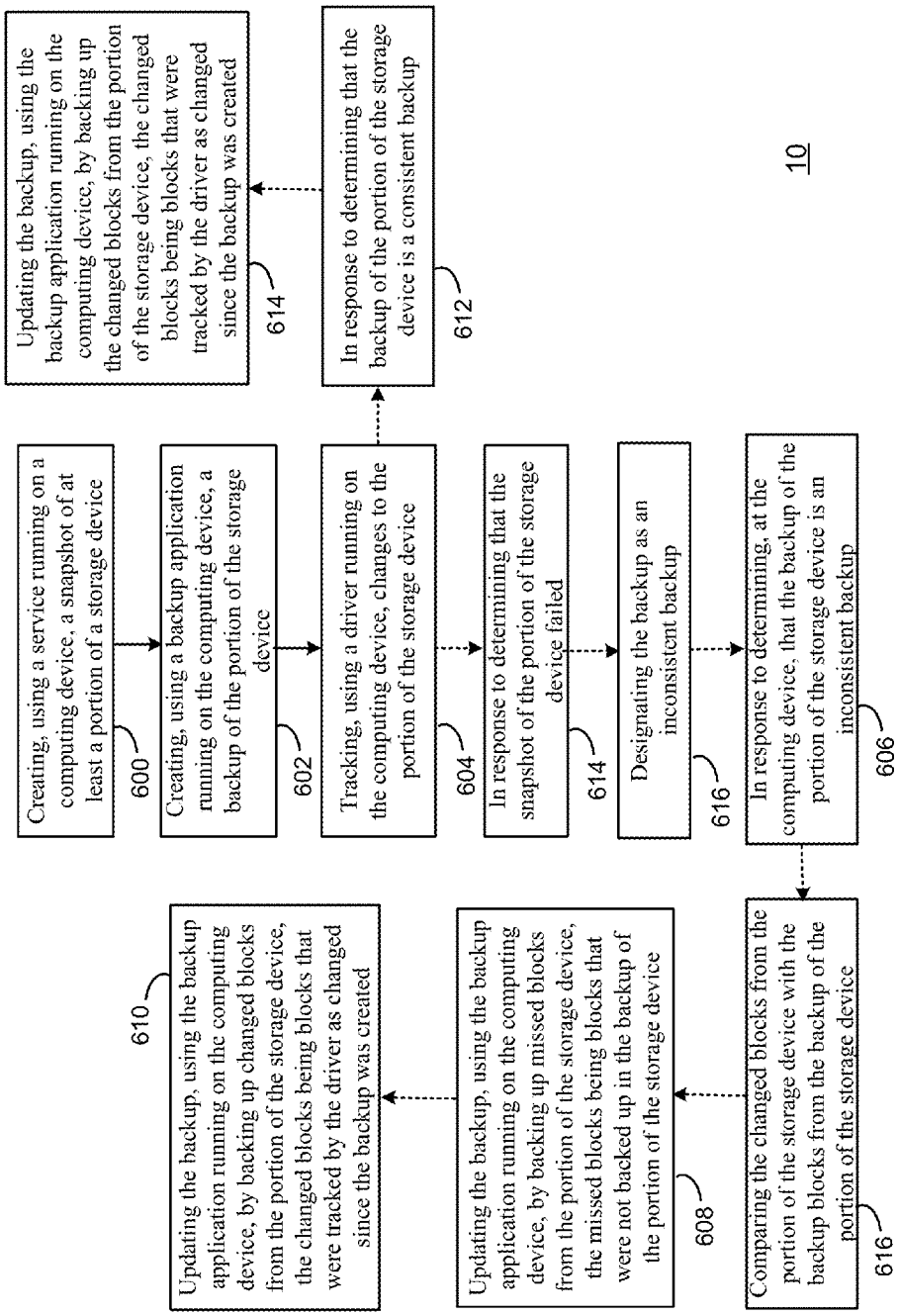
FIG. 7 is a flowchart illustrating an example process for consistent backup of at least a portion of a storage device in accordance with the present disclosure.

Referring now to FIGS. 2 and 7, in an embodiment, consistent backup process 10 may create 600 a snapshot of at least a portion of a storage device (e.g., storage device 303). The snapshot may be created (101) using a service that may run on a computing device (e.g., computing device 300). The service may be part of consistent backup application 10 or consistent backup process 10, either of which may be part of backup system 305. The service may be, for example, Volume Shadow Service (VSS).

Further, consistent backup process 10 may create 602 a backup of the portion of the storage device (e.g., storage device 303). The backup may be created using a backup application, which may run on a computing device (e.g., computing device 300). The backup application may be part of consistent backup application 10 or consistent backup process 10. Consistent backup process 10 may also track 604 changes to the portion of the storage device (e.g., storage device 303). The changes may be tracked (102) using a driver, which may run on a computing device (e.g., computing device 300). The driver may be part of consistent backup application 10 or consistent backup process 10. The driver may be, for example, a Volume Tracker Driver (e.g., Volume Tracker Driver 302). Referring now also to FIG. 4, and for example, OS 301 may change data on storage device 303. Volume Tracker Driver 302 may intercept I/O requests from OS 301 and may creates a list of changed blocks.

For example, OS 301 may change the data in set of blocks 500 from A, B, C, D, and E, to A, F, C, G, and E, as shown in set of blocks 502. Volume Tracker Driver 302 may detect the changes from set of blocks 500 to set of blocks 502.

Snapshot operations may fail for a number of reasons. For example, a timeout feature may be included in an operating system (e.g., OS 301) that is running the snapshot. The snapshot may be kept alive during the timeout period. If the timeout period is exceeded, the snapshot may be deleted. Consistent backup process 10 may determine that the snapshot operation failed. In response to determining 614 that the snapshot of, for example, a portion of a storage device, has failed, consistent backup process 10 may designate 616 the backup as an inconsistent backup. Besides failure of the snapshot, the backup may become inconsistent for other reasons. In other words, consistent backup process 10 may determine (103) whether the last backup is consistent.

In response to determining 606 that the backup of the portion of the storage device is an inconsistent backup, consistent backup process 10 may update 608 the backup by backing up missed blocks from the portion of the storage device. The missed blocks may be blocks that were not backed up in the backup of the portion of the storage device. The backup may be updated using the backup application, which may run on the computing device (e.g., computing device 300). In an implementation, consistent backup process 10 may create an additional backup that includes the missed blocks from the portion of the storage device.

Figure 3:
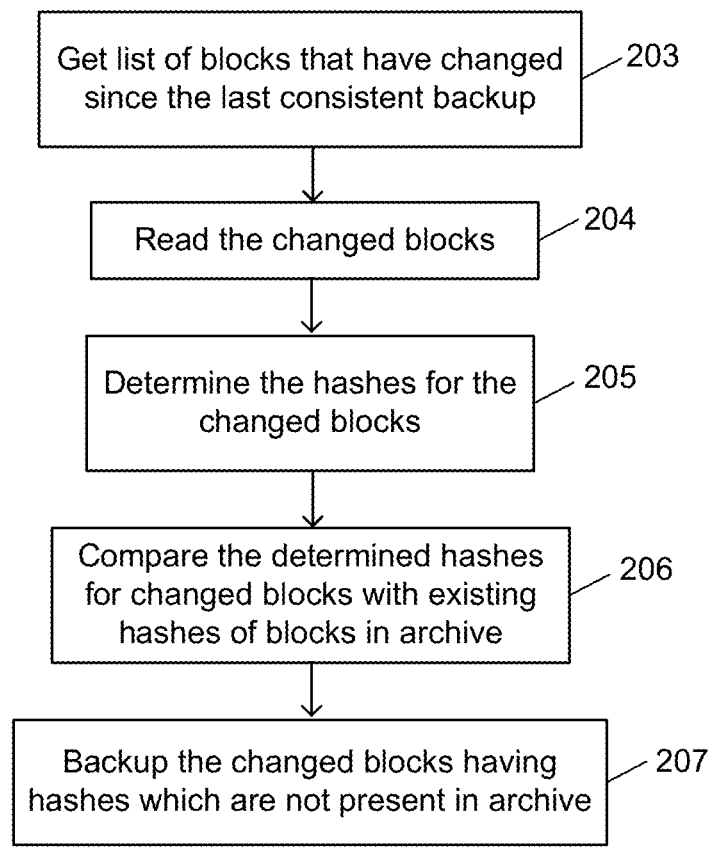
FIG. 3 is a continuation of the flowchart of FIG. 2.

Referring now also to FIG. 3, consistent backup process 10 may create a consistent backup (201) by acquiring or getting a list of blocks that have changed since the last consistent backup 203. In one embodiment, the list of changed blocks 304 may come from the driver (e.g., Volume Tracker Driver 302) that tracks changes to the portion of the storage device. The list of changed blocks may include addresses of the changed blocks at storage device 303. As shown in FIG. 3, the consistent backup may include reading the changed blocks 204. Further, consistent backup process 10 may determine the hashes for the changed blocks 205. The consistent backup process may also compare the determined hashes for changed blocks with existing hashes of blocks in archive 206. For example, consistent backup process 10 (which may be part of backup system 305) may compare (202) the changed blocks with the blocks in the last backup. In an implementation, consistent backup process 10 may backup the changed blocks having hashes which are not present in archive 207. In this way consistent backup process 10 may create a consistent backup after an inconsistent one.

Referring back to FIG. 6, set of blocks 504 may show that only data A and B were backed up before the snapshot failed. Other blocks from set of blocks 502 were not backed so the backup became inconsistent. Volume Tracker Driver 302 may detect that some data changed from set of blocks 500 (e.g., B→F and D→G as shown in set of blocks 506). As shown in set of blocks 510, consistent backup process 10 may update the missed blocks and the changed blocks in the backup. As shown in set of blocks 512, Volume Tracker Driver 302 may longer reflect that changed data exists, until further changes are made.

As such, consistent backup process 10 may update 610 the backup by backing up changed blocks from the portion of the storage device. The changed blocks may be blocks that were tracked by the driver as changed since the backup was created. Consistent backup process 10 may use the backup application running on the computing device (e.g., computing device 300) to backup the changed blocks from the portion of the storage device. In an implementation, consistent backup process 10 may create an additional backup that includes the changed blocks from the portion of the storage device.

In some circumstances, the backup may not become inconsistent. The snapshot may not fail and the backup may be consistent. In response to determining 612 that the backup of the portion of the storage device is a consistent backup, consistent backup process 10 may update 614 the backup by backing up the changed blocks from the portion of the storage device. The changed blocks may be blocks that were tracked by the driver as changed since the backup was created. The backup application running on the computing device (e.g., computing device 300) may be used to back up the changed blocks from the portion of the storage device. For example, consistent backup process 10 (which may be part of backup system 305) may backup (104) all blocks changed since the previous backup was created.

Still, the snapshot may subsequently fail (105), and in this case, consistent backup process 10 may determine 606 that the backup of the portion of the storage device is an inconsistent backup. Consistent backup process 10 (which may be part of backup system 305) may mark (107) the backup as inconsistent and may continue (108) with the backup process by creating (101) a snapshot. In this way, consistent backup process 10 may create a fault-tolerant backup. If the snapshot does not fail, the backup process may proceed and finish (106), resulting in a consistent backup.

Figure 5:
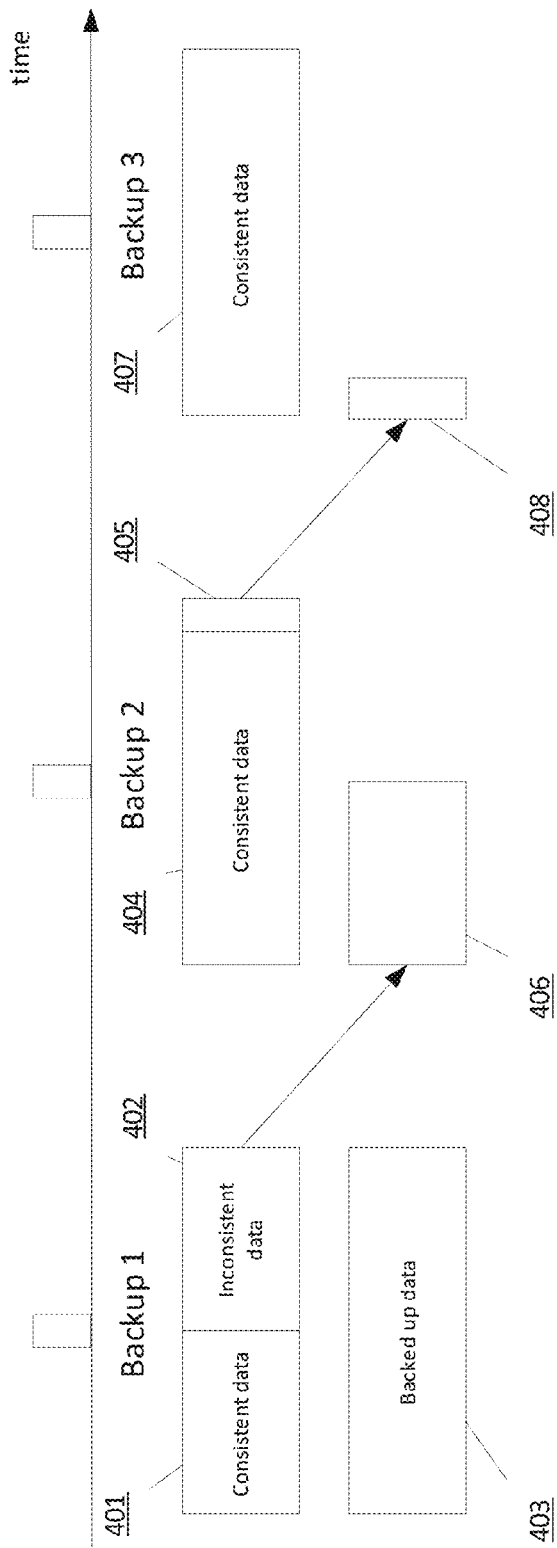
FIG. 5 is a diagrammatic flowchart illustrating the incremental nature of implementations of the present disclosure.

Referring now to FIG. 5, a diagrammatic flowchart illustrating the incremental nature of some implementations of the present disclosure is show. Example results of the techniques and features described herein are shown. In an implementation, a first backup, a second backup, and a third backup may be created. Backed up data 403 for the first backup may include consistent data 401, which may be data that was backed up before a snapshot failure. The first backup may also include inconsistent data 402, which may be data that was backed up after the snapshot failure. Backed up data 403 from the first backup may include both consistent data 401 and inconsistent data 402.

Further, the second backup may include consistent data 404 and inconsistent data 405. Consistent data 404 from the second backup may be a sum of consistent data 401 from the first backup and backed up data 406 from the second backup. Inconsistent data 405 from the second backup may be data that was backed up after a second snapshot failure. Backed up data 406 from the second backup may include inconsistent data 402 from the first backup 403.

Additionally, the third backup may include consistent data 407. Consistent data 407 may include consistent data 404 from the second backup and backed up data 408 from the third backup. Backed up data 408 from the third backup may include inconsistent data 405 from the second backup.

Figure 8:
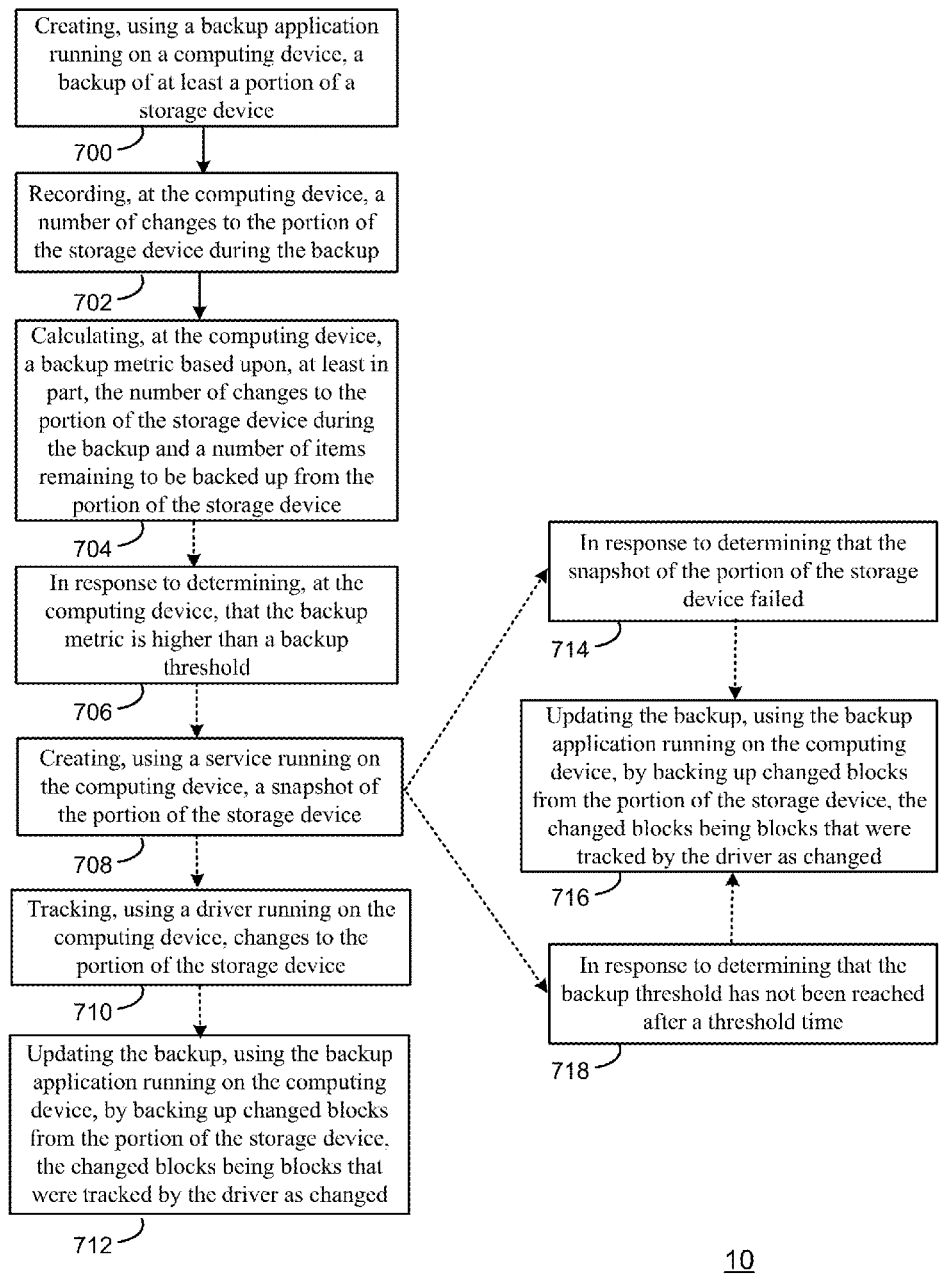
FIG. 8 is also a flowchart illustrating an example process for consistent backup of at least a portion of a storage device in accordance with the present disclosure.

Referring now to FIG. 8, in an implementation, a backup operation may be started without a snapshot. For example, consistent backup process 10 may create 700 a backup of at least a portion of a storage device (e.g., storage device 303). The backup may be created using a backup application running on a computing device (e.g., computing device

300). The backup application may include consistent backup process 10, both of which may be part of backup system 305. Blocks or files from storage device 303 may be backed up as they are on the disk. Further, consistent backup process 10 may record 702 (e.g., at computing device 300) a number of changes to the portion of the storage device (e.g., storage device 303) during the backup. For optimization purposes, the changes themselves may not be recorded, but may be recorded in an implementation.

Consistent backup process 10 may calculate 704 (e.g., at computing device 300) a backup metric based upon, at least in part, the number of changes to the portion of the storage device (e.g., storage device 303) during the backup and a number of items remaining to be backed up from the portion of the storage device (e.g., storage device 303). In response to determining 706 (e.g., at computing device 300) that the backup metric is higher than a backup threshold, consistent backup process 10 may create 708 a snapshot of the portion of the storage device (e.g., storage device 303). The snapshot may be created using a service (e.g., Volume Shadow Service) running on the computing device (e.g. computing device 300). The backup threshold may be a ratio of changed data to unchanged data in the portion of the storage device since the backup was created.

Consistent backup process 10 may track 710 changes to the portion of the storage device. The changes may be tracked using a driver (e.g., Volume Tracker Driver 302) running at the computing device (e.g., computing device 300). Further, consistent backup process 10 may update 712 the backup by backing up changed blocks from the portion of the storage device (e.g., storage device 303). The changed blocks being blocks that were tracked by the driver as changed. The backup may be updated using a backup application (e.g., backup system 305) running on the computing device (e.g., computing device 300).

In response to determining 714 that the snapshot of the portion of the storage device failed, or in response to determining 718 that the backup threshold has not been reached after a threshold time, consistent backup process 10 may update 716 the backup by backing up changed blocks from the portion of the storage device (e.g., storage device 303). The changed blocks may be blocks that were tracked by the driver (e.g., Volume Tracker Driver 302) as changed. The backup may be updated using the backup application (e.g., backup system 305) running on the computing device (e.g., computing device 300).

The snapshot may have failed due to lack of system resources (e.g., disk space, memory) or because a time to keep the snapshot was exceed, as an OS may keep a snapshot for only a particular amount of time. An inconsistent backup first created may also be kept depending on a user or customer desire. While the backup may not be consistent it may suffice if the alternative is to restart a machine after a sudden power failure. Some modern applications may be able to recover some or all data in that case. In an implementation, the backup process may survive a power shutdown if it is known what data was already backed up. For example, a backup could be initiated, the machine could be shutdown and restarted, and the backup may continue from where it left off.

The techniques and features described herein may be beneficial for online or cloud backup because in some situations, connections or communications with client machines and the cloud may not be reliable. For example, the client machine may be offline because the user is not near the machine or is without WiFi. The techniques and features described herein may also be beneficial for large volume backup because in the case of a power failure or other cause of backup failure, there may not be a need to back up all the data over again. Only the data that was not backed up prior to the failure, and data the was changed during the backups, may need to be subsequently backed up for a consistent backup.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for consistent backup of at least a portion of a storage device, the method comprising:
    creating, using a backup application running on a computing device, a backup of the at least a portion of the storage device;
    recording, at the computing device, a number of changes to the portion of the storage device during the backup;
    calculating, at the computing device, a backup metric based upon one or more changes to the portion of the storage device during the backup and one or more items remaining to be backed up from the portion of the storage device;

in response to determining, at the computing device, that the backup metric is higher than a backup threshold:

creating, using a service running on the computing device, a snapshot of the portion of the storage device;

tracking, using a driver running on the computing device, changes to the portion of the storage device; and updating the backup, using the backup application running on the computing device, by backing up changed blocks from the portion of the storage device, the changed blocks being blocks that were tracked by the driver as changed since the backup was created.

2. The method of claim 1, further comprising:
in response to determining that the snapshot of the portion of the storage device failed: designating the backup as an inconsistent backup.

3. The method of claim 1, further comprising:
comparing the changed blocks from the portion of the storage device with the backup blocks from the backup of the portion of the storage device.

4. A computer program product residing on a non-transitory computer readable storage medium having a plurality of instructions stored thereon, which, when executed by a processor, cause the processor to perform operations for consistent backup of at least a portion of a storage device, the operations comprising:

creating, using a backup application running on a computing device, a backup of the portion of the storage device;

recording, at the computing device, a number of changes to the portion of the storage device during backup:

calculating, at the computing device, a backup metric based upon, at least in part, the number of changes to the portion of the storage device during the backup and a number of items remaining to be backed up from the portion of the storage device:

in response to determining, at the computing device, that the backup metric is higher than a backup threshold:

creating, using a service running on the computing device, a snapshot of the portion of the storage device:

tracking, using a driver running on the computing device, changes to the portion of the storage device: and updating the backup, using the backup application running on the computing device, by backing up changed blocks from the portion of the storage device, the changed blocks being blocks that were tracked by the driver as changed.

5. The computer program product of claim 4, wherein the operations further comprise:
in response to determining that the backup of the portion of the storage device is a consistent backup:
update the backup, using the backup application running on the computing device, by backing up the changed blocks from the portion of the storage device, the changed blocks being blocks that were tracked by the driver as changed since the backup was created.

6. The computer program product of claim 4, wherein the operations further comprise:
in response to determining that the snapshot of the portion of the storage device failed: designating the backup as an inconsistent backup.

7. The computer program product of claim 4, wherein the operations further comprise:
comparing the changed blocks from the portion of the storage device with the backup blocks from the backup of the portion of the storage device.

8. A computing system for consistent backup of at least a portion of a storage device, the computing system comprising one or more processors, wherein the one or more processors are configured to:

create, using a backup application running on a computing device, a backup of the portion of the storage device;

record, at the computing device, a number of changes to the portion of the storage device during the backup:

calculate, at the computing device, a backup metric based upon one or more changes to the portion of the storage device during the backup and one or more items remaining to be backed up from the portion of the storage device:

in response to determining, at the computing device, that the backup metric is higher than a backup threshold:

create, using a service running on the computing device, a snapshot of the portion of the storage device;

track, using a driver running on the computing device, changes to the portion of the storage device; and update the backup, using the backup application running on the computing device, by backing up changed blocks from the portion of the storage device, the changed blocks being blocks that were tracked by the driver as changed.

9. The computing system of claim 8, wherein the one or more processors are further configured to:
in response to determining that the backup of the portion of the storage device is a consistent backup:
update the backup, using the backup application running on the computing device, by backing up the changed blocks from the portion of the storage device, the changed blocks being blocks that were tracked by the driver as changed since the backup was created.

10. The computing system of claim 8, wherein the one or more processors are further configured to:
in response to determining that the snapshot of the portion of the storage device failed: designate the backup as an inconsistent backup.

11. The computing system of claim 8, wherein the one or more processors are further configured to:
compare the changed blocks from the portion of the storage device with the backup blocks from the backup of the portion of the storage device.

12. A method for consistent backup of at least a portion of a storage device, the method comprising:

creating, using a backup application running on a computing device, a backup of at least a portion of a storage device;

recording, at the computing device, a number of changes to the portion of the storage device during the backup;

calculating, at the computing device, a backup metric based upon, at least in part, the number of changes to the portion of the storage device during the backup and a number of items remaining to be backed up from the portion of the storage device;

in response to determining, at the computing device, that the backup metric is higher than a backup threshold:

creating, using a service running on the computing device, a snapshot of the portion of the storage device;

tracking, using a driver running on the computing device, changes to the portion of the storage device; and updating the backup, using the backup application running on the computing device, by backing up changed blocks from the portion of the storage device, the changed blocks being blocks that were tracked by the driver as changed.

13. The method of claim 12, further comprising:

in response to determining that the snapshot of the portion of the storage device failed:

updating the backup, using the backup application running on the computing device, by backing up changed blocks from the portion of the storage device, the changed blocks being blocks that were tracked by the driver as changed.

14. The method of claim 12, further comprising:

in response to determining that the backup threshold has not been reached after a threshold time:

updating the backup, using the backup application running on the computing device, by backing up changed blocks from the portion of the storage device, the changed blocks being blocks that were tracked by the driver as changed.

15. The method of claim 12, wherein the backup threshold is a ratio of changed data to unchanged data in the portion of the storage device since the backup was created.

16. A computing system for consistent backup of at least a portion of a storage device, the computing system comprising one or more processors, wherein the one or more processors are configured to:

create, using a backup application running on a computing device, a backup of at least a portion of a storage device;

record, at the computing device, a number of changes to the portion of the storage device during the backup;

calculate, at the computing device, a backup metric based upon, at least in part, the number of changes to the portion of the storage device during the backup and a number of items remaining to be backed up from the portion of the storage device;

in response to determining, at the computing device, that the backup metric is higher than a backup threshold:

create, using a service running on the computing device, a snapshot of the portion of the storage device;

track, using a driver running on the computing device, changes to the portion of the storage device; and update the backup, using the backup application running on the computing device, by backing up changed blocks from the portion of the storage device, the changed blocks being blocks that were tracked by the driver as changed.

* * * * *